United States Patent [19]
Yoshida

[11] Patent Number: 5,942,820
[45] Date of Patent: Aug. 24, 1999

[54] STRUCTURE OF SPINDLE MOTOR IN A DISK DRIVE AND METHOD OF ASSEMBLING THE DISK DRIVE

[75] Inventor: Mitsuaki Yoshida, Kawasaki, Japan

[73] Assignee: Fujitsu Limited, Kawasaki, Japan

[21] Appl. No.: 08/740,630

[22] Filed: Oct. 31, 1996

[30] Foreign Application Priority Data

Oct. 31, 1995 [JP] Japan ..................................... 7-283505

[51] Int. Cl.⁶ ............................ H02K 5/00; H02K 15/00; G11B 17/02
[52] U.S. Cl. ............................ 310/67 R; 310/42; 310/90; 29/596; 360/98.07; 360/99.08
[58] Field of Search ............................ 360/98.07, 99.04, 360/99.08, 99.11; 310/67 R, 42, 90; 29/596

[56] References Cited

U.S. PATENT DOCUMENTS

| | | | |
|---|---|---|---|
| Re. 34,270 | 6/1993 | Tochiyama et al. | 360/98.02 |
| 4,337,491 | 6/1982 | Hasler et al. | 360/97 |
| 4,717,977 | 1/1988 | Brown | 360/98 |
| 4,797,762 | 1/1989 | Levy et al. | 360/99.06 |
| 4,905,110 | 2/1990 | Krum et al. | 360/99.08 |
| 4,928,029 | 5/1990 | Wright | 310/89 |
| 4,980,587 | 12/1990 | Yonei et al. | 310/67 R |
| 5,160,865 | 11/1992 | Gururangan | 310/67 R |
| 5,177,650 | 1/1993 | Jabbari et al. | 360/99.06 |
| 5,402,023 | 3/1995 | Nakanishi et al. | 310/90 |

FOREIGN PATENT DOCUMENTS

| | | | |
|---|---|---|---|
| 0425312A2 | 5/1991 | European Pat. Off. | G11B 19/20 |
| 3153747C2 | 12/1981 | Germany | G11B 19/20 |
| 3918958A1 | 3/1990 | Germany | H02K 5/173 |
| 58102364 | 6/1983 | Japan . | |
| 61170973 | 8/1986 | Japan . | |
| 294062 | 4/1990 | Japan . | |
| 6-14511 | 1/1994 | Japan | 310/40 MM |
| 6162730 | 6/1994 | Japan . | |
| 7192388 | 7/1995 | Japan . | |
| 8106713 | 4/1996 | Japan . | |
| 8212753 | 8/1996 | Japan . | |

*Primary Examiner*—Nestor Ramirez
*Assistant Examiner*—Burton Mullins
*Attorney, Agent, or Firm*—Greer, Burns & Crain, Ltd.

[57] ABSTRACT

A spindle motor has a simple structure that is usable with a base having sufficient rigidity and enables heads to sandwich each recording disk outside the base. The spindle motor for rotating the disks and an actuator for driving the heads are assembled on the base into a disk drive. A rotor assembly of the spindle motor consists of a stationary shaft separable from the base, bearings attached around the stationary shaft, a hub installed around the bearings, a yoke attached to the hub, magnets attached to the yoke, and magnetic seals arranged at the top and bottom of the bearings, to seal the inside of the hub from the atmosphere in the disk drive. The stationary shaft has a skirt serving as a positioner for positioning the rotor assembly with respect to the base. The base has a hole for receiving the stationary shaft and stator coils concentrically arranged around the hole. The stationary shaft of the rotor assembly is engaged with the hole of the base, to complete the spindle motor.

18 Claims, 9 Drawing Sheets

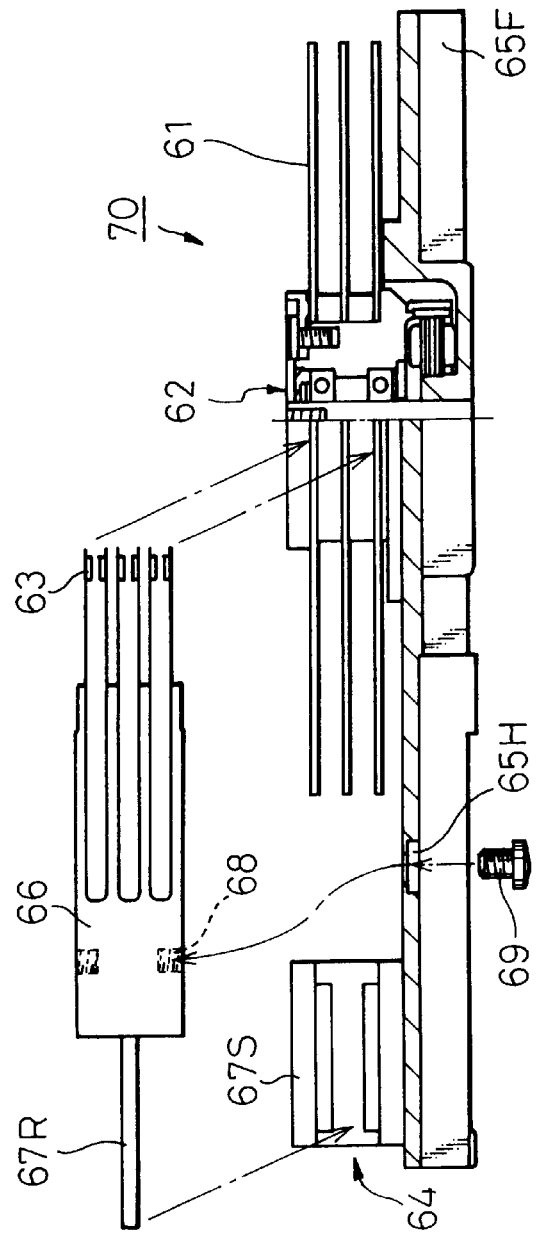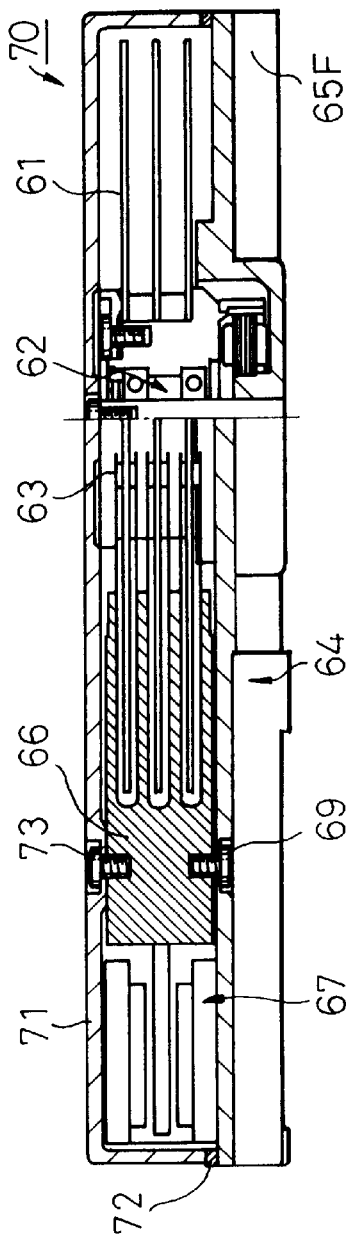

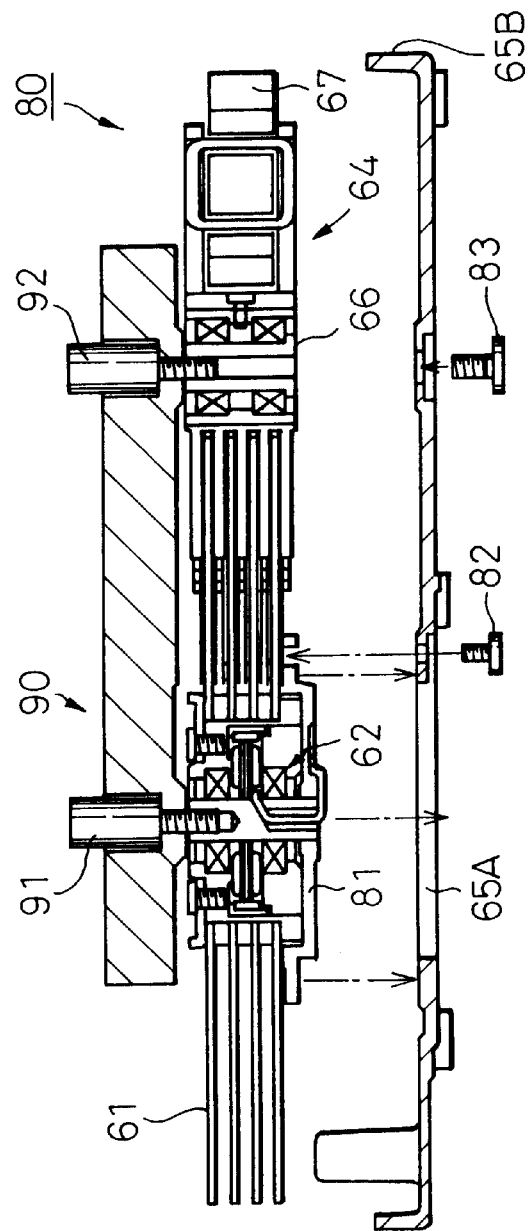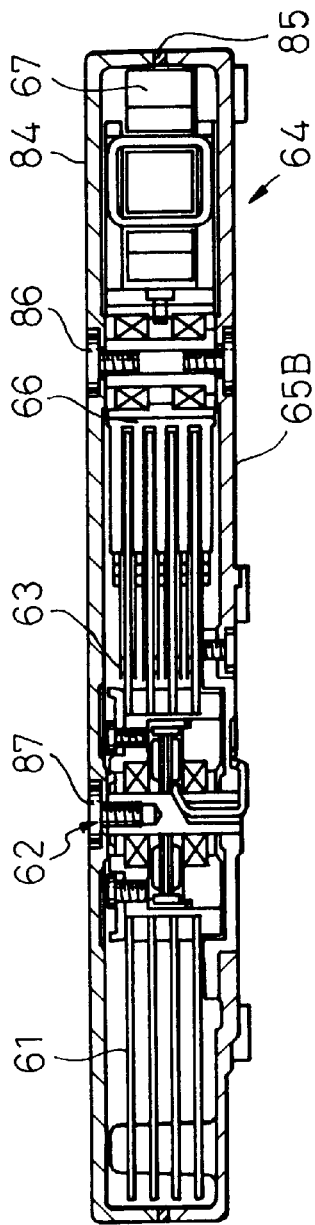

STRUCTURE OF SPINDLE MOTOR IN A DISK DRIVE AND METHOD OF ASSEMBLING THE DISK DRIVE

BACKGROUND OF THE INVENTION

1. Field of the Invention

The present invention relates to the structure of a spindle motor in a disk drive and a method of assembling the disk drive, and particularly, to the structure of a spindle motor that is easy to assemble to form a magnetic disk drive serving as an external storage device of a computer and a method of assembling the magnetic disk drive.

2. Description of the Related Art

Disk drives such as magnetic disk drives are classified into low- and high-end drives. The low-end drives have an average storage capacity and performance and are inexpensive. The high-end drives have a large storage capacity and high operation speed but are expensive. The high-end drives rotate many magnetic disks at a high speed.

The high-end drives involve complicated manufacturing processes because they have many magnetic disks around a spindle and because heads mounted on a carriage must be inserted among the disks. It is desired to provide a high-end magnetic disk drive having a simple structure that is assembled through a small number of processes.

A conventional magnetic disk drive has magnetic disks serving as recording media, a spindle motor for turning the disks at a specified speed, heads for writing and reading data to and from the disks, an actuator for positioning the heads on the disks, and a base (housing) for supporting the spindle motor and actuator. The actuator consists of a carriage, which holds the heads, and a voice coil motor for driving the carriage. The voice coil motor consists of a stator fixed to the base and a rotor that is a part of the carriage.

The shapes of the base or housing of the disk drive are classified into flat and bathtub. A necessary condition for the flat base here is that the surface thereof for mounting a spindle motor and an actuator is flat. It is not necessary for the flat base to have a flat surface for mounting a printed circuit assembly. Methods of assembling the flat and bathtub disk drives will be explained.

The flat-base disk drive will be explained first. The shaft of a spindle motor is fixed to the flat base by pressure or by an adhesive agent. Magnetic disks are attached to a hub of the spindle motor. A stator of a voice coil motor is fixed to the base.

An actuator, which has a carriage with heads, is mounted on the base so that the heads may not interfere with the disks. A shaft hole of the carriage is aligned with a shaft hole of the base, and a rotary shaft is inserted into the shaft holes from under the base. The carriage is turned to sandwich each disk between the heads. At the same time, the rotor of the voice coil motor integral with the carriage is inserted into the stator.

A cover is fitted to the base with a gasket being placed between them. Upper rotary shafts of the carriage and the spindle motor are attached to the cover. The spindle motor rotates the magnetic disks, and the voice coil motor swings the carriage to position the heads on the disks.

The bathtub-base disk drive will be explained next. A spindle motor is provided with a flange in advance. The spindle motor has a hub to which magnetic disks are attached. A bathtub base has a hole for receiving the flange.

The spindle motor is suspended from a first support of a jig. An actuator is fabricated from a voice coil motor and a carriage having heads. The carriage is suspended from a second support of the jig so that the heads may not interfere with the disks. The carriage is turned to sandwich each disk between the heads.

The jig with the spindle motor and actuator is lowered onto the bathtub base so that the flange fits into the hole of the base. The flange is fixed to the hole, and the carriage is fixed to the base.

A cover is fitted to the base with a gasket placed between them. An upper rotary shaft of the spindle motor and an upper rotary shaft of the actuator are attached to the cover. The spindle motor rotates the magnetic disks, and the voice coil motor swings the carriage to position the heads on the disks.

As mentioned above, the flat base is provided with the spindle motor in advance. The magnetic disks are attached to the spindle motor, and the actuator is mounted on the base. Thereafter, the actuator is turned to sandwich each disk between the heads. Namely, the flat base needs a space for turning the actuator to set the heads in the disks. In other words, the base must be flat to turn the actuator, and bases of other shapes do not allow this assembling method. The flat base is inapplicable to support a spindle motor that turns many disks at a high speed. The flat base may be warped due to clamping during a servo track write operation. The flat base has low rigidity and a low resonance point to do not resonate with the vibration of the bearing balls of the spindle motor. This may cause an error in the servo track write operation.

On the other hand, the bathtub-base disk drive employs the spindle motor provided with the flange. Each magnetic disk on the spindle motor is sandwiched between the heads of the carriage outside the base. Thereafter, the spindle motor and carriage are mounted on the base. The bathtub base is stronger than the flat base. The bathtub base, however, has the large hole to receive the flange. Accordingly, a part of the base where the flange overlaps the base is thin to deteriorate the rigidity of the base. The spindle motor having the flange is structurally complicated to increase the cost thereof.

SUMMARY OF THE INVENTION

A first object of the present invention is to provide the structure of a spindle motor in a disk drive and a method of assembling the disk drive, capable of installing heads of an actuator on disks attached to the spindle motor outside a base of the disk drive. The base has no flange fitting hole, and therefore, is sufficiently rigid to firmly support the spindle motor.

A second object of the present invention is to provide a spindle motor having a simple structure in a disk drive and a method of assembling the disk drive, which is capable of reducing the cost of the spindle motor and is easy to assemble on a base.

In order to achieve the objects, the present invention provides the structure of a spindle motor in a disk drive. The disk drive has the spindle motor for turning at least one recording disk, a carriage having at least one head to write and read data to and from the disks, a voice coil motor for driving the carriage, and a base for supporting these components. The spindle motor consists of a stationary shaft separable from the base, a hub serving as a rotor and supporting the disks, a yoke and magnets arranged at the bottom of the periphery of the hub, bearings arranged at the top and bottom of the stationary shaft, to rotatably support the hub with respect to the stationary shaft, seals arranged at the top and bottom of the bearings, to seal the inside of the hub from the atmosphere in the disk drive, a hole formed on the base, to receive the stationary shaft, stator coils concentrically arranged around the hole of the base, to face the magnets when the stationary shaft is set in the hole, and a positioner formed at a joint between the stationary shaft and the hole, to position the stationary shaft with respect to the base.

The positioner may have a skirt protruding from the stationary shaft, or a flange fixed to the periphery of the stationary shaft, to position the stationary shaft vertically. The positioner may have a fitting part formed on the stationary shaft, to position the stationary shaft horizontally. A groove may be formed between the skirt and the base, to accommodate an annular seal. The stationary shaft may have a neck facing the groove, to support the annular seal.

Each end face of the stationary shaft has an axial threaded hole, the bottom threaded hole being fastened to the base with a screw and the top one being fastened to a cover with a screw. The cover is attached to the base. One of the threaded holes is extended to an intermediate position between the bearings. A horizontal hole is formed across the stationary shaft, to communicate with the extended hole and an internal space defined by the two bearings, hub, and stationary shaft. The screw engaging with the bottom threaded hole has an axial vent hole. Instead of the threaded holes, at least one thread may be formed around the periphery of at least one end of the stationary shaft. A nut is fastened to the thread from the outside, to fix the stationary shaft to the housing of the disk drive. In this case, a longitudinal hole is formed through the threaded part up to the horizontal hole.

The seals may each be a magnetic seal. In the alternative, one of the seals may be a magnetic seal and the other may be a single or multiple labyrinth seal.

The present invention also provides a method of assembling a disk drive. The disk drive consists of a spindle motor for turning at least one recording disk, a carriage having at least one head to write and read data to and from the disks, a voice coil motor for driving the carriage, and a base for supporting these components. The spindle motor consists of a stationary shaft separable from the base, a hub serving as a rotor and supporting the disks, a yoke and magnets arranged at the bottom of the periphery of the hub, bearings arranged at the top and bottom of the stationary shaft, to rotatably support the hub with respect to the stationary shaft, seals arranged at the top and bottom of the bearings, to seal the inside of the hub from the atmosphere in the disk drive, a hole formed on the base, to receive the stationary shaft, stator coils concentrically arranged around the hole of the base, to face the magnets when the stationary shaft is set in the hole, and a positioner formed at a joint between the stationary shaft and the hole, to position the stationary shaft with respect to the base.

A first step of the method mounts the hub with the disks on the stationary shaft through the bearings, attaches the yoke and magnets to the bottom of the periphery of the hub, and seals the inside of the hub with the seals, to prepare the rotor. A second step prepares the carriage having the heads. A third step concentrically arranges the stator coil around the hole of the base. A fourth step installs the stator of the voice coil motor on the base. A fifth step attaches the rotor and carriage to suspension screws of a jig, respectively. The suspension screws align with the stationary shaft fitting hole and carriage shaft fitting hole formed on the base. A sixth step places the jig with the rotor and carriage onto the base and fastens screws into the stationary shaft fitting hole and carriage shaft fitting hole, to fix the rotor and carriage to the base.

In this way, the present invention provides the structure of a bottom-rotor spindle motor consisting of a discrete rotor assembly and base assembly, with the rotor assembly having a stationary shaft with a positioner and magnets, and the base assembly having a stator for electromagnetically providing the magnets with torque. Before installing the assemblies on a base, magnetic disks can be fitted to the rotor assembly, and heads are arranged for the magnetic disks. Thereafter, the rotor assembly is set in the base assembly. This structure improves the rigidity of the base, to strongly support the spindle motor, and is produced at a low cost.

BRIEF DESCRIPTION OF THE DRAWINGS

The present invention will be more clearly understood from the description as set forth below with reference to the accompanying drawings, wherein:

FIG. 2A is an assembly view showing a prior art flat-base disk drive with a carriage being assembled with a spindle motor;

FIG. 2B is a sectional view showing the assembled disk drive of FIG. 2A;

FIG. 3A shows a prior art bathtub-base disk drive having a spindle motor with a flange, the spindle motor and a carriage being simultaneously mounted on a base;

FIG. 3B is a sectional view showing the assembled disk drive of FIG. 3A;

DESCRIPTION OF THE PREFERRED EMBODIMENTS

Before describing the preferred embodiments, an explanation will be given of the conventional structure of a spindle motor in a disk drive and method of assembling the disk drive shown in FIGS. 1 to 3B.

Figure 1:
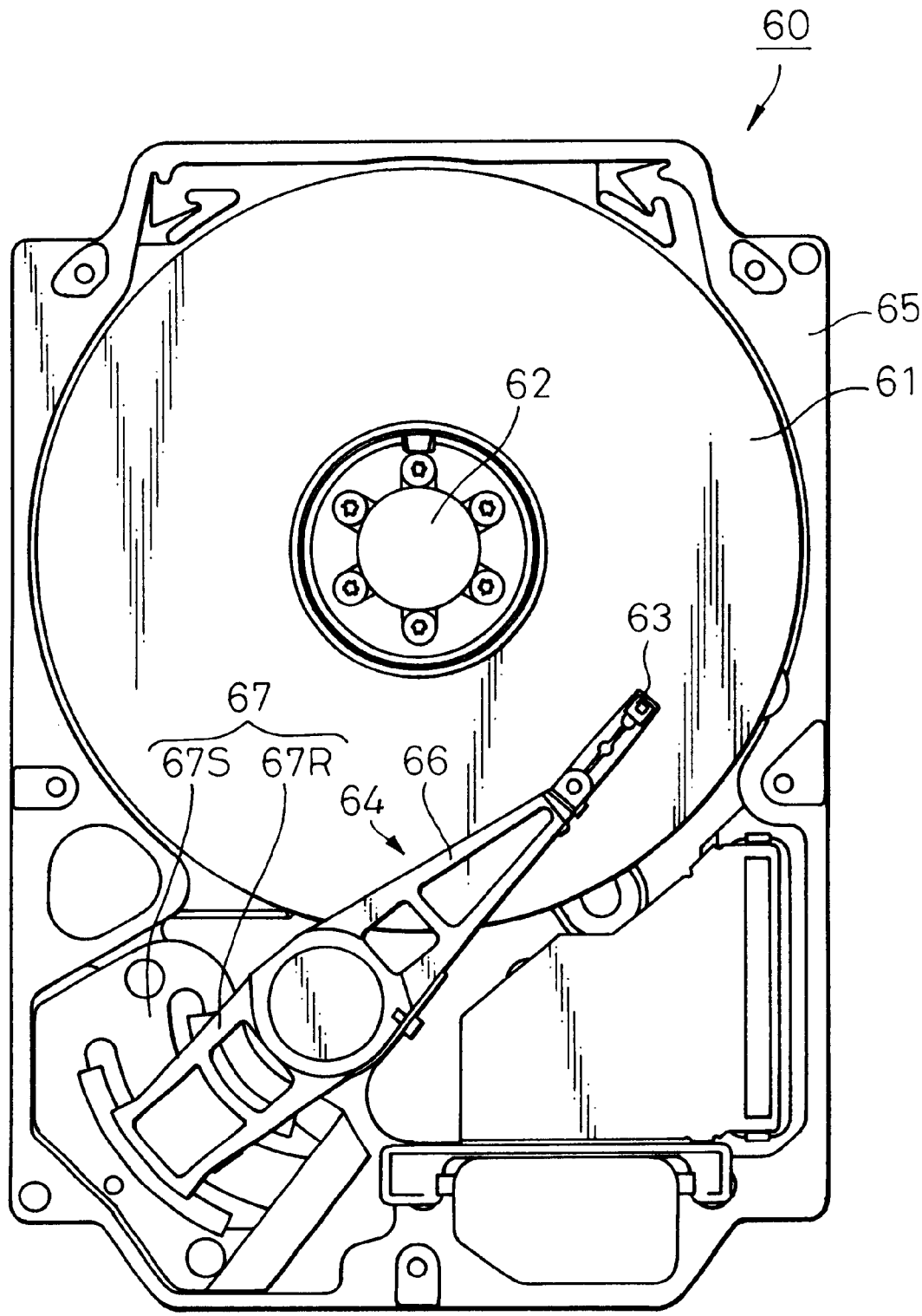
FIG. 1 is a plan view showing a prior art disk drive.

FIG. 1 is a plan view showing a conventional magnetic disk drive 60 with a cover removed. The disk drive 60 has magnetic disks 61, a spindle motor 62 for rotating the disks 61 at a specified speed, heads 63 for writing and reading data to and from the disks 61, an actuator for positioning the heads 63 on the disks 61, and a base (housing) 65 for supporting the spindle motor 62 and actuator 64. The actuator 64 consists of a carriage 66 for holding the heads 63 and a voice coil motor 67 for driving the carriage 66. The voice coil motor 67 consists of a stator 67S fixed to the base 65 and a rotor 67R forming a part of the carriage 66.

The base 65 may be a flat base or a bathtub base. FIGS. 2A and 2B show a flat-base magnetic disk drive 70, and FIGS. 3A and 3B show a bathtub-base magnetic disk drive 80. The structure of a spindle motor of each disk drive, and a method of assembling each disk drive will be explained.

In FIG. 2A, the spindle motor 62 is attached to a base 65F in advance by pressure or by an adhesive agent. The spindle motor 62 has a hub to which magnetic disks 61 are attached. A stator 67S of a voice coil motor 67 is fixed to the base 65F.

Assembling the disk drive 70 will be explained. An actuator 64 having a carriage 66 provided with heads 63 is mounted on the base 65F so that the heads 63 may not interfere with the disks 61. A shaft hole 68 of the carriage 66 is aligned with a shaft hole 65H of the base 65F, and a rotary shaft 69 is inserted into the hole 68 from under the base 65F. The carriage 66 is turned to sandwich each disk 61 between the heads 63. At the same time, a rotor 67R is inserted into the stator 67S.

FIG. 2B shows the completed disk drive 70. A cover 71 is attached to the base 65F with a gasket 72 interposed between them. An upper rotary shaft 73 is fitted to the carriage 66 through the cover 71. The spindle motor 62 drives the disks 61, and the voice coil motor 67 swings the carriage 66 to position the heads 63 on a target track on the disks 61.

FIG. 3A shows the bathtub-base magnetic disk drive 80 before assembly. A flange 81 of a specified size is attached to a spindle motor 62 in advance. The spindle motor 62 has a hub to which magnetic disks 61 are attached. A base 65B has a large hole 65A for receiving the flange 81.

Assembling the disk drive 80 will be explained. A jig 90 has a first support 91 to which the spindle motor 62 with the disks 61 is set. An actuator 64 having a carriage 66 provided with heads 63 and a voice coil motor 67 is set to a second support 92 of the jig 90, so that the heads 63 may not interfere with the disks 61. The carriage 66 on the second support 92 is turned to sandwich each disk 61 between the heads 63.

The jig 90 with the spindle motor 62 and actuator 64 is lowered onto the base 65B so that the flange 81 engages with the hole 65A. The flange 81 is fixed to the hole 65A with a screw 82, and the carriage 66 is fixed to the same base 65B with a screw 83.

FIG. 3B shows the completed disk drive 80. A cover 84 is fixed to the base 65B with a gasket 85 interposed between them. An upper rotary shaft 87 is fastened to the spindle motor 62 through the cover 84, and an upper rotary shaft 86 is fastened to the actuator 64 through the cover 84. The spindle motor 62 drives the disks 61, and the voice coil motor 67 swings the carriage 66 to position the heads 63 on a target track on the disks 61.

According to the flat-base disk drive 70 of FIGS. 2A and 2B, the spindle motor 62 is mounted on the base 65F in advance by pressure or by an adhesive agent. The magnetic disks 61 are attached to the spindle motor 62, the carriage 66 of the actuator 64 is fixed to the base 65F with the rotary shaft 69, and the carriage 64 is turned to sandwich each disk 61 between the heads 63. Accordingly, there must be a space to keep the heads 63 of the carriage 66 away from the disks 61 when the carriage 66 is fixed to the base 65F with the rotary shaft 69. This is why the base 65F must be flat.

The flat base 65F is unsuitable if the spindle motor 62 must rotate many disks 61 at a high speed. The flat base 65F may be warped due to clamping during a servo track write (STW) operation. The rigidity of the flat base 65F is low to easily resonate with the vibration of moving balls of the bearings of the spindle motor 62. This may cause an error in the servo track write operation.

According to the bathtub-disk drive 80 of FIGS. 3A and 3B, the spindle motor 62 is provided with the flange 81 to be fixed to the base 65B. Accordingly, the heads 63 are arranged between the disks 61 outside the base 65B, and then, they are installed on the base 65B. This makes the bathtub base 65B stronger than the flat base 65F.

The bathtub base 65B, however, must have the large hole 65A to receive the flange 81. Accordingly, a part of the base 65B where the base overlaps the flange 81 is thin to deteriorate the rigidity of the base 65B. The structure of the spindle motor 62 provided with the flange 81 is complicated as shown in FIGS. 3A and 3B, which increases the cost thereof.

Next, the structure of a spindle motor for a magnetic disk drive and a method of assembling the disk drive according to the present invention will be explained.

The general structure of the disc drive of the present invention is basically the same as that of the magnetic disk drive 60 of FIG. 1, and therefore, it will not be explained again. The present invention is different from the prior art in the structure of the spindle motor in the disk drive.

Figure 4A:
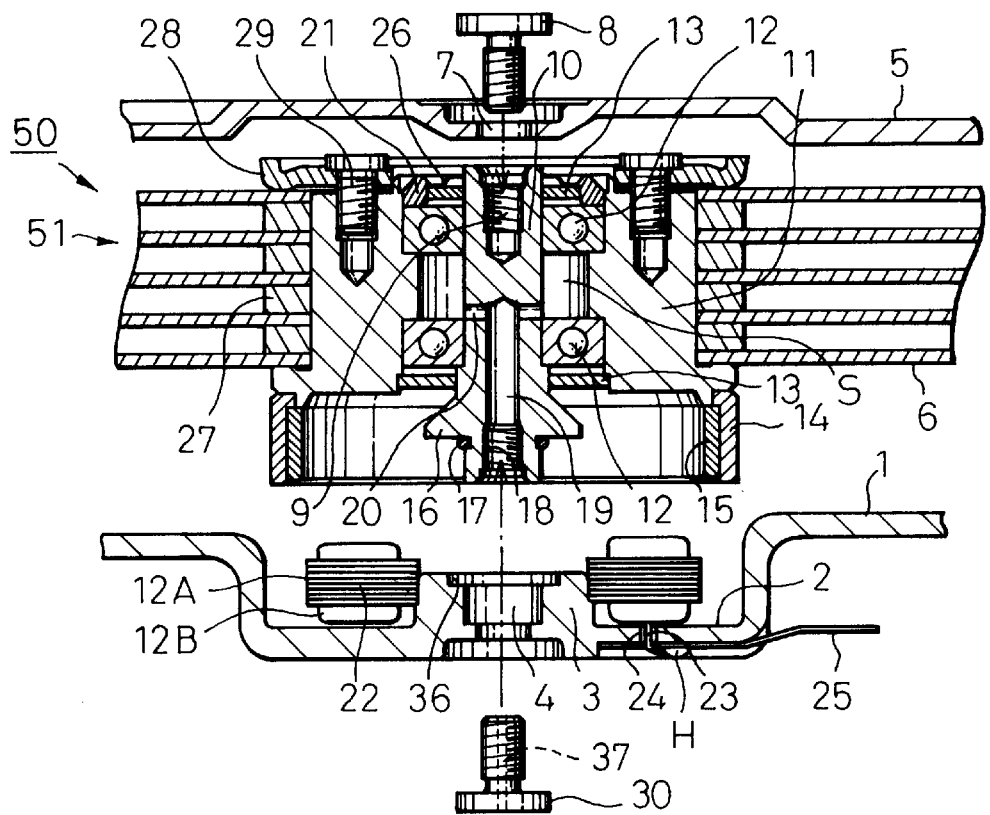
FIG. 4A is an assembly view showing a spindle motor of a disk drive according to a first embodiment of the present invention.
Figure 4B:
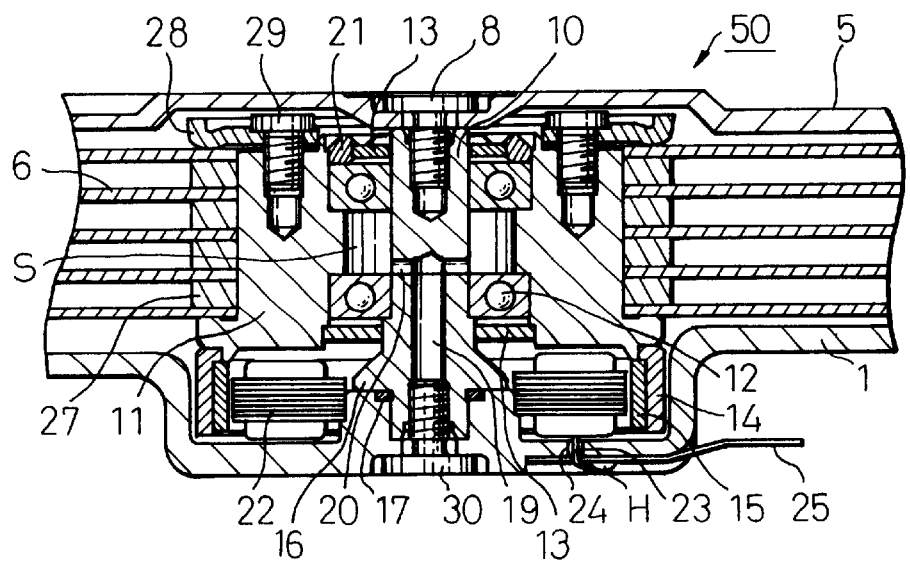
FIG. 4B is a sectional view showing the assembled spindle motor of FIG. 4A.

FIG. 4A is an assembly view showing the spindle motor 50 according to the first embodiment of the present invention. FIG. 4B is a sectional view showing the assembled spindle motor 50.

The spindle motor 50 has a stationary shaft 10 that supports two bearings 12. The bearings 12 rotatably support a hub 11. At the top of the hub 11, an annular holder 21 supports a magnetic seal 13. Magnetic disks 6 separated by spacers 27 are attached to the periphery of the hub 11. A clamp 28 is fixed to the top of the hub 11 with screws 29, to fix the magnetic disks 6. A yoke 14 is fixed by caulking or adhesion to the bottom of the hub 11. Magnets 15 are adhered to the inner wall of the yoke 14.

The stationary shaft 10 has a skirt 16 below a lower magnetic seal 13. The bottom of the skirt 16 is orthogonal to the longitudinal axis of the stationary shaft 10.

Figure 5A:
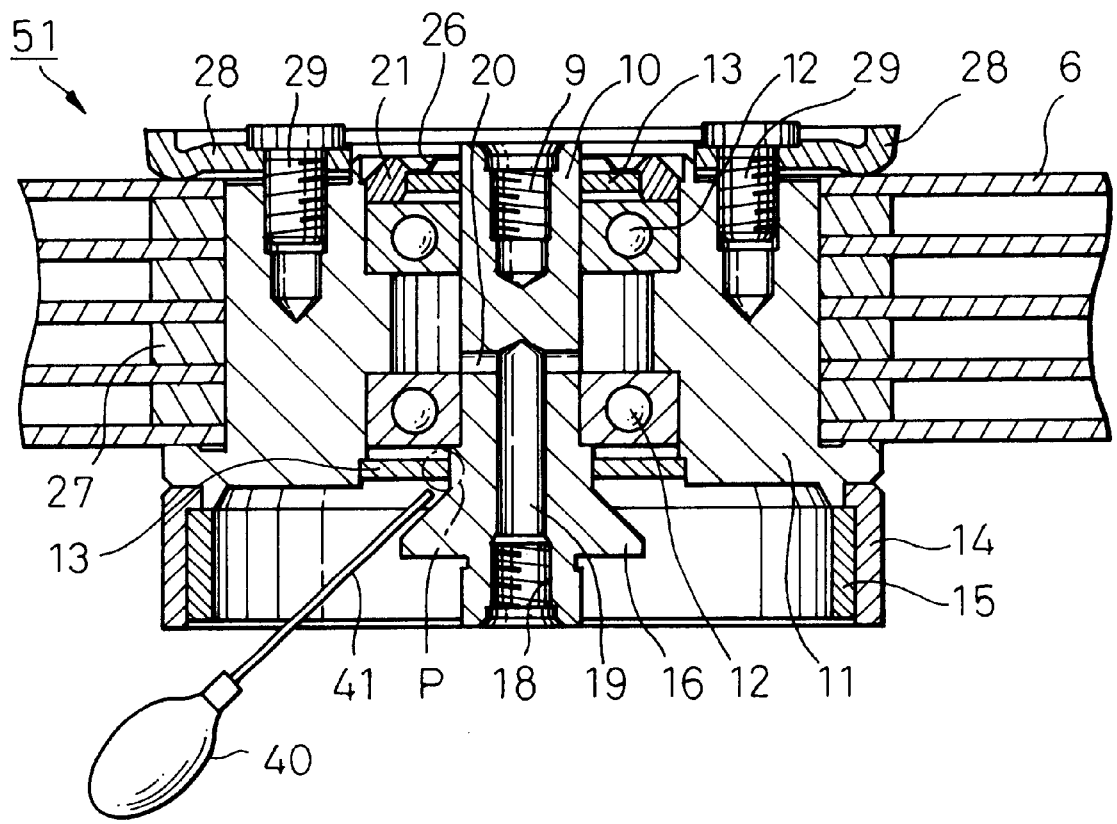
FIG. 5A shows injecting a magnetic sealant into the spindle motor of FIG. 4A.
Figure 5B:
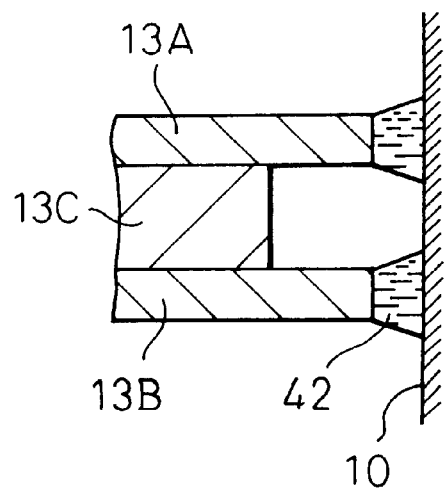
FIG. 5B is an enlarged view showing a part P of FIG. 5A.

FIG. 5A shows the skirt 16 and the periphery thereof. After a rotor assembly 51 is completed, a nozzle 41 of a dispenser 40 is inserted along a slope of the skirt 16, to inject magnetic fluid 42 to a part P. FIG. 5B shows the details of the part P. The magnetic seal 13 consists of two pole pieces 13A and 13B and a magnet 13C sandwiched between the pole pieces 13A and 13B. The magnetic fluid 42 injected by the dispenser 40 fills spaces between the pole pieces 13A and 13B and the periphery of the stationary shaft 10. A protector 26 is arranged between the top of the upper magnetic seal 13 and the clamp 28.

Tapped and threaded holes 9 and 18 are formed on the end faces of the stationary shaft 10 along the axis of the stationary shaft 10. The lower hole 18 extends upwardly to form a vertical hole 19, which reaches an intermediate position between the bearings 12. The hole 19 communicates with a horizontal hole 20, which communicates with a space S defined by the inner wall of the hub 11, the bearings 12, and the periphery of the stationary shaft 10.

The end face of the skirt 16 abuts on the base 1, to vertically position the stationary shaft 10. A part of the stationary shaft 10 below the skirt 16 is precisely processed, to horizontally position the stationary shaft 10 with respect to the base 1.

Figure 6A:
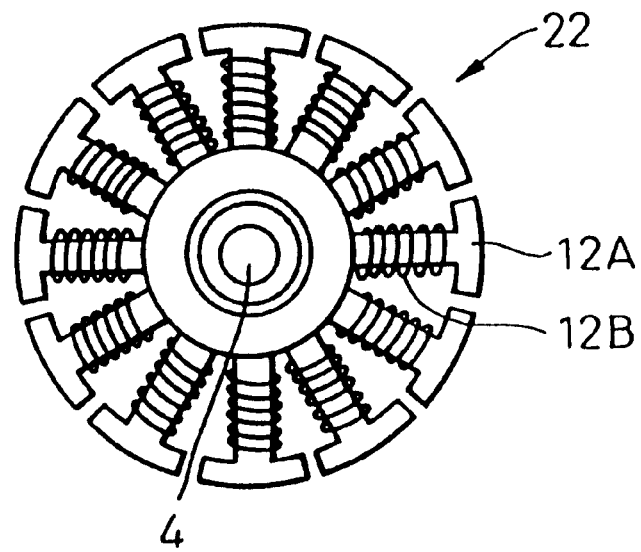
FIG. 6A is a plan view showing the stator coils of a spindle motor arranged on a base of a disk drive according to the present invention.

The base 1 has a recess 2 for accommodating a stator 22. A projection 3 is formed at the center of the recess 2. The projection 3 has a hole 4 and a groove 36. An O-ring 17 is placed around the stationary shaft 10 and is received by the groove 36. The stator 22 of the spindle motor 50 is arranged around the projection 3. The stator 22 is, for example, a 12-pole magnet consisting of 12 cores 12B each wound with a coil 12A as shown in FIG. 6A.

A lead wire 23 extends from the coils 12B. A lead hole is formed at the bottom of the recess 2 of the base 1, and an insulation bush 24 is inserted in the lead hole. The lead wire 23 is drawn outside the base 1 through the lead hole as shown in FIG. 4A and is soldered to a flexible printed circuit (FPC) 25 as indicated with a reference mark H. The lead hole is sealed with an adhesive.

Figure 6B:
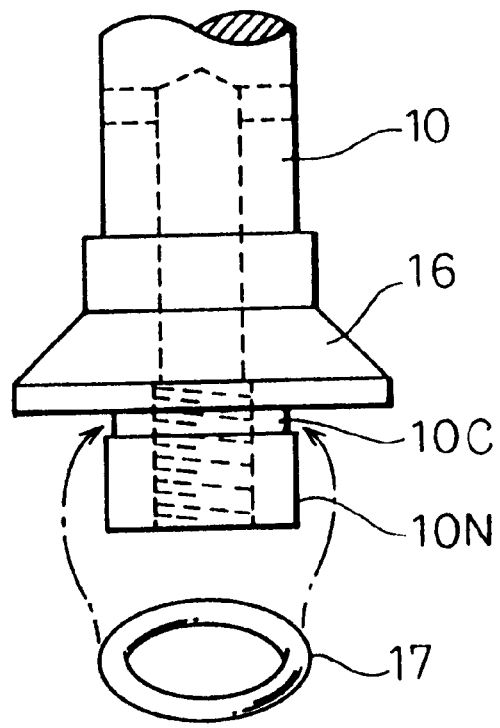
FIG. 6B is an enlarged view showing a neck of a stationary shaft of FIG. 4A.

A part of the stationary shaft 10 below the skirt 16 forms a neck 10N as shown in FIG. 6B. The neck 10N includes a channel 10C that holds the O-ring 17 and engages with the projection 3 of the base 1. The O-ring 17 seals a space between the skirt 16 and the projection 3.

Assembling the spindle motor 50 will be explained.

The rotor assembly 51 of FIG. 5A is assembled first. The hub 11 and magnetic seals 13 are attached to the stationary shaft 10 through the bearings 12. The magnetic disks 6 of, for example, five pieces with the spacers 27 are mounted on the hub 11. The protector 26 is attached to the upper magnetic seal 13, and the clamp 28 is fixed with the screws 29.

As shown in FIG. 4A, the tip of the stationary shaft 10 is inserted into the hole 4 of the projection 3 of the base 1 so that the skirt 16 abuts on the top of the projection 3. The screw 30 is inserted into the hole 4 from the outside and is fastened to the threaded hole 18. The screw 30 has an axial vent hole 37. When the screw 30 is fitted to the base 1, the inner space S of the hub 11 is ventilated through the holes 19, 20, and 37.

The cover 5 is placed on the base 1, to cover the rotor assembly 51. The screw 8 is passed through the hole 7 of the cover 5 and is fastened to the threaded hole 9 to fix the cover 5 to the rotor assembly 51. FIG. 4B shows the assembled base 1, rotor assembly 51, and cover 5.

A method of assembling the rotor assembly 51 and a carriage assembly 52 into a magnetic disk drive will be explained with reference to FIGS. 7A and 7B.

As mentioned above, the hub 11 and magnetic seals 13 are attached to the stationary shaft 10 through the bearings 12. Five magnetic disks 6, for example, and the spacers 27 are installed on the hub 11. The clamp 28 is fixed with the screw 29, to complete the rotor assembly 51. At this time, the channel 10C under the skirt 16 of the stationary shaft 10 is provided with the O-ring 17.

A carriage 46 is attached to a stationary shaft 45 through bearings 47. Heads 43 are attached to the front ends of arms 44 of the carriage 46. A rotor 54 of a voice coil motor is integral with the carriage 46 opposite to the arms 44.

The rotor assembly 51 and carriage assembly 52 are set on the jig 90. The jig 90 has first and second supports 91 and 92, which are designed to align with the rotational axes of the assemblies 51 and 52 on the base 1, respectively. The rotor assembly 51 is set on the first support 91, and the carriage assembly 52 is set on the second support 92. At this time, the carriage assembly 52 is set so that the heads 43 do not interfere with the disks 6.

The carriage assembly 52 on the second support 92 is turned so that the heads 43 may face the disks 6.

Figure 7A:
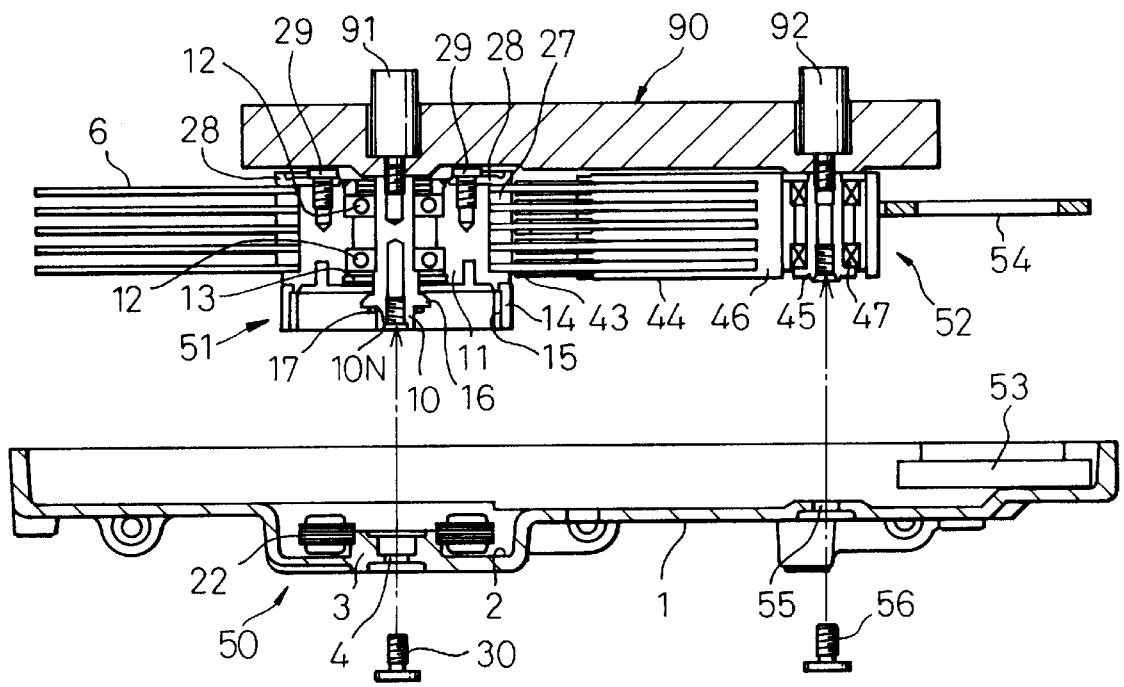
FIGS. 7A and 7B show steps of assembling the spindle motor of FIGS. 4A and 4B.

On the other hand, the stator 22 of the spindle motor 50 is arranged around the projection 3 on the base 1 as shown in FIG. 7A and is wired. A part of a stator 53 of the voice coil motor is arranged at an end of the base 1.

The jig 90 with the rotor assembly 51 and carriage assembly 52 is moved so that the stationary shaft 10 is aligned with the hole 4 in the projection 3 of the base 1 and the shaft of the carriage 46 is aligned with a hole 55 of the base 1. Then, the jig 90 with the rotor assembly 51 and carriage assembly 52 is lowered onto the base 1.

The screw 30 is passed through the hole 4 from the bottom of the base 1 and is fastened to the stationary shaft 10, thereby fixing the rotor assembly 51 to the base 1. A screw 56 is passed through the hole 55 from the bottom of the base 1, to fix the shaft 45 of the carriage assembly 52 to the base 1.

The jig 90 is removed. The remaining part of the stator 53 of the voice coil motor is arranged. The cover 5 is placed on the base 1 with a gasket 57 interposed between them. The rotor assembly 51 is fixed to the cover 5 with the screw 8, and the carriage assembly 52 is fixed to the cover 5 with a screw 58.

As explained above, the first embodiment arranges the heads 43 of the carriage assembly 52 between the disks 6 of the rotor assembly 51 outside the base 1. The base 1 has no large flange hole, and therefore, the rigidity thereof is sufficient to firmly support the spindle motor 50. The structure of the spindle motor 50 with the separable rotor assembly 51 and stator 22 is simple, which reduces the cost thereof, and is easy to install on the base 1.

Figure 8A:
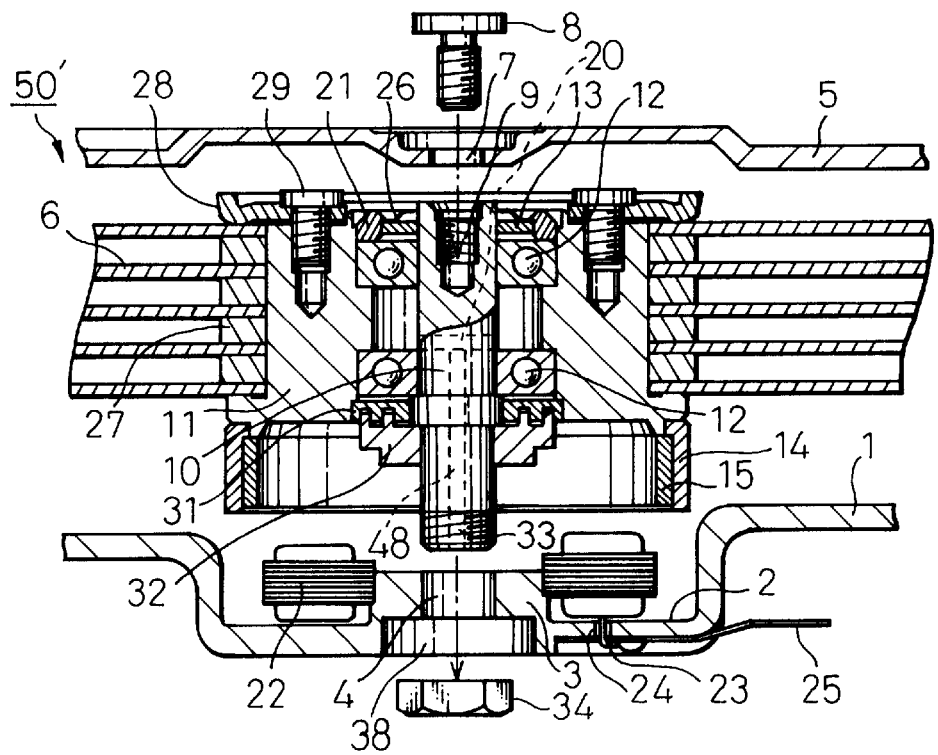
FIG. 8A is an assembly view showing a spindle motor of a disk drive according to a second embodiment of the present invention.
Figure 8B:
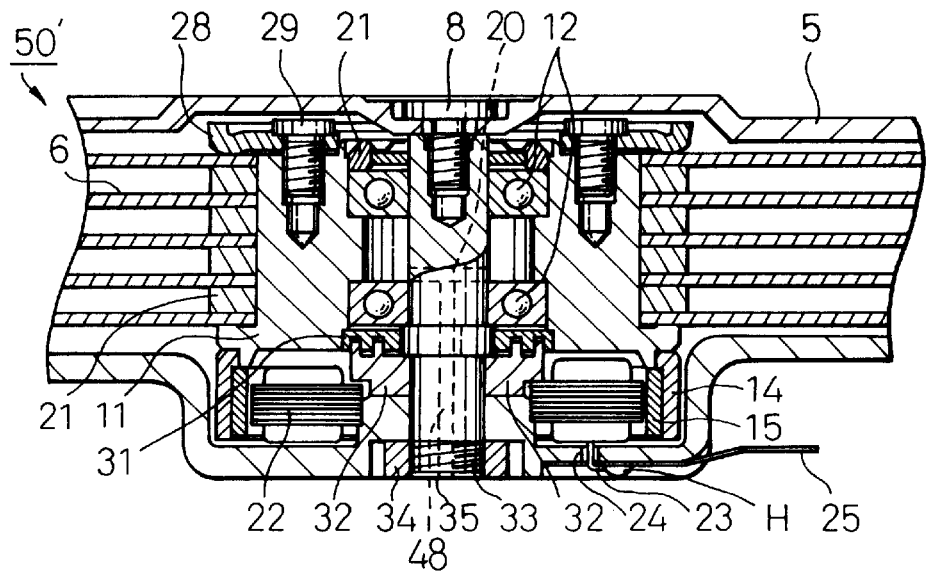
FIG. 8B is a sectional view showing the assembled spindle motor of FIG. 8A.

FIG. 8A is an assembly view showing a spindle motor 50' of a magnetic disk drive according to the second embodiment of the present invention. FIG. 8B is a sectional view showing the assembled spindle motor 50'. In the figures, the same parts as those of FIGS. 4A and 4B are represented with like reference numerals.

The spindle motor 50' has a stationary shaft 10 around which two bearings 12 are arranged. The bearings 12 rotatably support a hub 11. A magnetic seal 13 is attached to the top inner wall of the hub 11 with an annular holder 21. A labyrinth seal 31 is arranged on the bottom inner wall of the hub 11. Magnetic disks 6 are spaced apart from each other by spacers 27 and are fixed to the periphery of the hub 11 with a clamp 28, which is fixed to the top of the hub 11 with screws 29. A yoke 14 is fixed by caulking or adhesion to the hub 11 below the disks 6. A specified number of magnets 15 are adhered to the inner wall of the yoke 14.

The stationary shaft 10 has an enlargement below the bearing 12. A flange 32 is fixed to the bottom of the enlargement. The bottom of the flange 32 is orthogonal to the longitudinal axis of the stationary shaft 10. The top of the flange 32 has a multiple labyrinth. A labyrinth seal 31 is attached to the inner wall of the hub 11 to face the enlargement of the stationary shaft 10. The labyrinth seal 31 has a multiple labyrinth that faces the multiple labyrinth on the flange 32.

Figure 9:
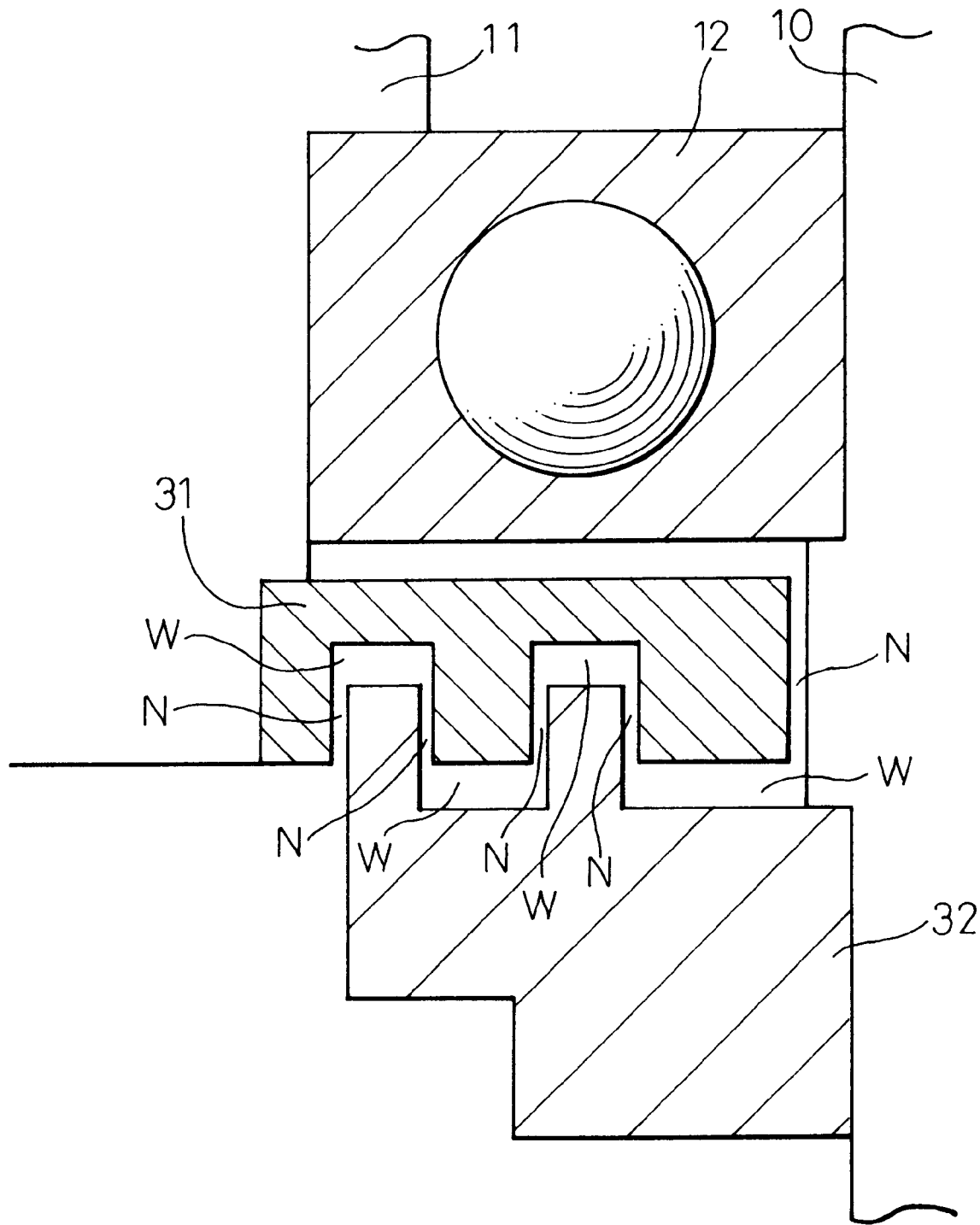
FIG. 9 is an enlarged view showing a part of a labyrinth seal of FIGS. 8A and 8B.

FIG. 9 is an enlarged section showing the multiple labyrinths on the labyrinth seal 31 and flange 32. Between the multiple labyrinths, there are alternating wide and narrow gaps W and N to produce alternating high and low pressures when the seal 31 rotates with the hub 11, to block air passage.

In FIG. 8A, a threaded hole 9 is formed on a top end face of the stationary shaft 10. The center line of the hole 9 agrees with the longitudinal axis of the stationary shaft 10. A thread 33 is formed around a bottom end of the stationary shaft 10. The bottom of the flange 32 that is orthogonal to the longitudinal axis of the stationary shaft 10 abuts on a base 1, to vertically position the stationary shaft 10. The bottom end of the stationary shaft 10 is precisely processed for vertical positioning.

The stationary shaft 10 has a vertical hole 48 starting from the bottom end thereof where the thread 33 is formed. The vertical hole 48 communicates with a horizontal hole 20.

The base 1 has a recess 2 for storing a stator 22 of the spindle motor 50'. The recess 2 has a center projection 3 having a hole 4. A nut hole 38 is formed adjacent to the hole 4. The stator 22 is arranged around the projection 3. The stator 22 is, for example, a 12-pole electromagnet consisting of 12 cores 12A each wound with a coil 12B as shown in FIG. 6A.

An end of the coils 12B is connected to a lead wire 23, which is drawn outside the base 1 through a lead hole into which an insulation bush 24 is inserted. The lead wire 23 is soldered to a flexible printed circuit 25 as indicated with a reference mark H. The lead hole is closed with an adhesive.

Assembling the spindle motor 50' will be explained.

A rotor assembly 51' is first assembled. The flange 32 having the multiple labyrinth is attached to the stationary shaft 10. The bearings 12, hub 11, and magnetic seals 13 are attached to the stationary shaft 10. The magnetic disks 6 of, for example, five pieces with the spacers 27 are attached to the hub 11. A protector 26 is fitted to the upper magnetic seal 13, and the clamp 28 is fixed with the screws 29.

The thread 33 formed at the end of the stationary shaft 10 is inserted into the hole 4 of the projection 3 of the base 1. The thread 33 protrudes into the nut hole 38. At this time, the bottom of the flange 38 abuts on the top of the projection 3. A nut 34 is fastened to the thread 33 from the outside of the nut hole 38. A seal 35 is attached to cover the nut 34.

A cover 5 is set on the base 1 over the rotor assembly 51'. A screw 8 is passed through a shaft hole 7 of the cover 5 and is fastened to the threaded hole 9, thereby fixing the cover 5 to the rotor assembly 51' as shown in FIG. 8B.

Figure 7B:
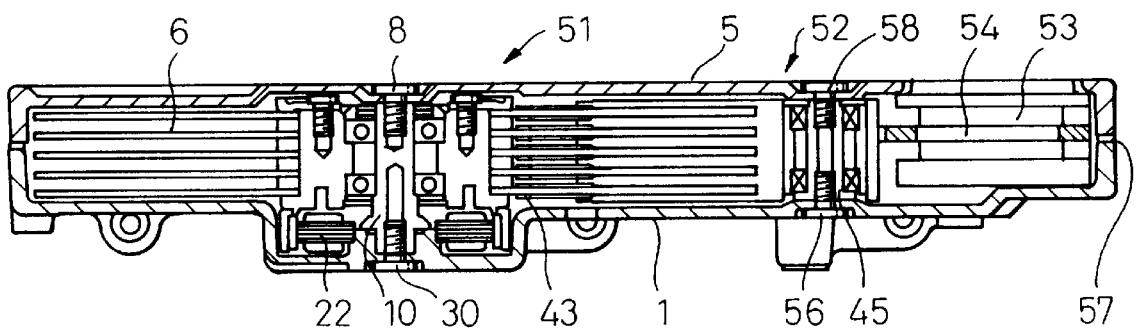

Assembling the rotor assembly 51' into a magnetic disk drive is the same as the first embodiment of FIGS. 7A and 7B and, therefore, it is not explained again.

As explained above, the second embodiment arranges the heads 43 of the carriage 52 between the disks 6 of the rotor assembly 51' outside the base 1. The base 1 has no large flange hole, and therefore, the rigidity thereof is sufficient to firmly support the spindle motor 50'. The structure of the spindle motor 50' with the separable rotor assembly 51' and stator 22 is simple, to reduce the cost thereof, and is easy to install on the base 1.

The spindle motor structures and the methods of assembling a disk drive of the present invention are applicable not only to magnetic disk drives but also to other disk drives such as optical disk drives.

What is claimed is:

1. A structure of a spindle motor in a disk drive, the disk drive including the spindle motor for turning at least one recording disk, a carriage having at least one head to write and read data to and from the at least one disk, a voice coil motor for driving the carriage, and a base for supporting the spindle motor, the carriage, and the voice coil motor, the structure comprising:

a stationary shaft separable from the base;
a hub serving as a rotor and supporting the at least one disk;
a yoke and magnets arranged at the bottom of the periphery of the hub;
bearings arranged at the top and bottom of the stationary shaft, to rotatably support the hub with respect to the stationary shaft;
seal means arranged at the top and bottom of the bearings, to seal the inside of the hub from the atmosphere in the disk drive;
a hole formed on the base, to receive the stationary shaft;
a recess formed in the base and surrounding the hole, the recess for supporting the spindle motor;
stator coils concentrically arranged on the base around the hole, to face the magnets and be seated below the bearings when the stationary shaft is set in the hole; and
positioning means formed at a joint between the stationary shaft and the hole, to position the stationary shaft with respect to the base, wherein the positioning means further has a fitting part formed on the stationary shaft to position the stationary shaft horizontally during insertion of the stationary shaft into the hole in the base.

2. The structure of claim 1, wherein the positioning means has a skirt protruding from the stationary shaft, to position the stationary shaft vertically.

3. The structure of claim 1, wherein the positioning means has a flange fixed to the periphery of the stationary shaft, to position the stationary shaft vertically.

4. The structure of claim 1, wherein each end face of the stationary shaft has an axial threaded hole, the bottom threaded hole is fastened to the base with a screw, the top threaded hole is fastened to a cover with a screw, the cover is attached to the base, one of the threaded holes has an extension hole up to an intermediate position between the bearings, and a horizontal hole is formed across the stationary shaft, to communicate with the extension hole and an internal space defined by the two bearings, the hub, and the stationary shaft.

5. The structure of claim 4, wherein the screw engaging with the bottom threaded hole has an axial vent hole.

6. The structure of claim 1, wherein at least one thread is formed around the periphery of at least one end of the stationary shaft and wherein a nut is fastened to the thread from the outside, to fix the stationary shaft to the housing of the disk drive.

7. The structure of claim 6, wherein a horizontal hole is formed across the stationary shaft to communicate with a longitudinal hole formed through the stationary shaft up to the horizontal hole.

8. The structure of claim 1, wherein the seal means are each a magnetic seal.

9. The structure of claim 1, wherein the seal means are a magnetic seal arranged at the top of the upper bearing and a labyrinth seal arranged at the bottom of the lower bearing.

10. The structure of claim 9, wherein the labyrinth seal is a multiple labyrinth seal.

11. The structure of claim 1, wherein the stationary shaft fitting hole is formed in a projection that extends upwardly from the recess in the base.

12. The structure defined in claim 1, wherein the recess in the base is integrally formed with the base, whereby the recess adds rigidity to the base.

13. The structure of claim 1, wherein the fitting part of the positioning means is precisely processed to position the stationary shaft with respect to the base.

14. A structure of a spindle motor in a disk drive, the disk drive including the spindle motor for turning at least one recording disk, a carriage having at least one head to write and read data to and from the at least one disk, a voice coil motor for driving the carriage, and a base, the structure comprising:

a stationary shaft separable from the base;

a hub serving as a rotor and supporting the at least one disk;

a yoke and magnets arranged at the bottom of the periphery of the hub;

bearings arranged at the top and bottom of the stationary shaft, to rotatably support the hub with respect to the stationary shaft;

seal means arranged at the top and bottom of the bearings, to seal the inside of the hub from the atmosphere in the disk drive;

a hole formed on the base, to receive the stationary shaft;

stator coils concentrically arranged around the hole, to face the magnets when the stationary shaft is set in the hole;

positioning means formed at a joint between the stationary shaft and the hole, to position the stationary shaft with respect to the base, the positioning means having a skirt protruding from the stationary shaft, to position the stationary shaft vertically; and a groove formed between the skirt and the base, to accommodate an annular seal.

15. The structure of claim 14, wherein the stationary shaft has a channel facing the groove, to support the annular seal.

16. A structure of a spindle motor in a disk drive, the disk drive including the spindle motor for turning at least one recording disk, a carriage having at least one head to write and read data to and from the at least one disk, a voice coil motor for driving the carriage, and a base, the structure comprising:

a stationary shaft separable from the base;

a hub serving as a rotor and supporting the at least one disk;

a yoke and magnets arranged at the bottom of the periphery of the hub;

bearings arranged at the top and bottom of the stationary shaft, to rotatably support the hub with respect to the stationary shaft;

seal means arranged at the top and bottom of the bearings, to seal the inside of the hub from the atmosphere in the disk drive;

a hole formed on the base, to receive the stationary shaft;

stator coils concentrically arranged around the hole, to face the magnets when the stationary shaft is set in the hole;

positioning means formed at a joint between the stationary shaft and the hole, to position the stationary shaft with respect to the base, the positioning means having a flange fixed to the periphery of the stationary shaft, to position the stationary shaft vertically;

a groove formed between the flange and the base, to accommodate an annular seal.

17. The structure of claim 15, wherein the stationary shaft has a channel facing the groove, to support the annular seal.

18. A method of assembling a disk drive, the disk drive including a spindle motor for turning at least one recording disk, a carriage having at least one head to write and read data to and from the at least one disk, a voice coil motor for driving the carriage, and a base, the spindle motor including a stationary shaft separable from the base, a hub serving as a rotor and supporting the at least one disk, a yoke and magnets arranged at the bottom of the periphery of the hub, bearings arranged at the top and bottom of the stationary shaft, to rotatably support the hub with respect to the stationary shaft, seal means arranged at the top and bottom of the bearings, to seal the inside of the hub from the atmosphere in the disk drive, a stationary shaft fitting hole formed on the base, to receive the stationary shaft, stator coils concentrically arranged around the stationary shaft fitting hole, to face the magnets when the stationary shaft is set in the stationary shaft fitting hole, and positioning means formed at a joint between the stationary shaft and the stationary shaft fitting hole, to position the stationary shaft with respect to the base, the method comprising the steps of:

mounting the hub with the at least one disk on the stationary shaft through the bearings, attaching the yoke and magnets to the bottom of the periphery of the hub, and sealing the inside of the hub with the seal means, to prepare the rotor;

assembling the carriage having the heads;

concentrically arranging the stator coils around the stationary shaft fitting hole of the base;

installing the stator of the voice coil motor on the base;

attaching the rotor and carriage to suspension screws of a jig, the suspension screws aligning with the stationary shaft fitting hole and a carriage shaft fitting hole formed on the base; and placing the jig with the rotor and carriage onto the base and fastening screws into the stationary shaft fitting hole and carriage shaft fitting hole, to fix the rotor and carriage to the base.

\* \* \* \* \*

UNITED STATES PATENT AND TRADEMARK OFFICE
CERTIFICATE OF CORRECTION

PATENT NO. : 5,942,820
DATED : August 24, 1999
INVENTOR(S) : Mitsuaki Yoshida

It is certified that error appears in the above-identified patent and that said Letters Patent is hereby corrected as shown below:

Column 12,
Line 11, delete "claim 15" and insert -- claim 16 -- therefor.

Signed and Sealed this

Thirty-first Day of July, 2001

*Attest:*

*Attesting Officer*

NICHOLAS P. GODICI
*Acting Director of the United States Patent and Trademark Office*